(12) United States Patent
Willett

(10) Patent No.: US 6,883,847 B2
(45) Date of Patent: Apr. 26, 2005

(54) CARRIERLESS FLANGE COVER WITH INTEGRAL TRIM STRIP

(75) Inventor: Kevin R. Willett, Maryville, TN (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 10/664,685

(22) Filed: Sep. 17, 2003

(65) Prior Publication Data

US 2005/0057058 A1  Mar. 17, 2005

(51) Int. Cl.$^7$ .................................................. E06B 7/16
(52) U.S. Cl. ..................... 296/1.08; 296/154; 296/93; 49/498.1; 52/800.13
(58) Field of Search .................. 296/154, 146.5, 296/146.7, 146.9, 1.08, 93, 213; 49/502, 49/377, 490.1, 498, 475.1; 52/716.8, 800

(56) References Cited

U.S. PATENT DOCUMENTS

| | | | |
|---|---|---|---|
| 4,246,303 A | 1/1981 | Townsend | |
| 4,311,747 A | 1/1982 | Kruschwitz | |
| 4,800,681 A | 1/1989 | Skillen et al. | |
| 4,984,843 A | 1/1991 | Villa et al. | |
| 5,122,406 A * | 6/1992 | Sakamaki et al. | 428/122 |
| 5,154,952 A | 10/1992 | Nozaki | |
| 5,255,472 A | 10/1993 | Larsen et al. | |
| 5,389,409 A | 2/1995 | Iwasa et al. | |
| 5,449,544 A * | 9/1995 | Ogawa et al. | 428/122 |
| 5,511,344 A * | 4/1996 | Dupuy | 49/496.1 |
| 5,527,583 A | 6/1996 | Nozaki et al. | |
| 5,693,419 A | 12/1997 | Nozaki | |
| 5,715,632 A | 2/1998 | Nozaki | |

(Continued)

FOREIGN PATENT DOCUMENTS

| | | |
|---|---|---|
| DE | 3523409 | 9/1986 |
| DE | 4443911 | 6/1996 |
| EP | 0329964 | 8/1989 |
| EP | 0689952 | 1/1996 |
| GB | 2242221 | 9/1991 |
| GB | 2294964 | 5/1996 |

OTHER PUBLICATIONS

English abstract of patent publication DE 3523409.
English abstract of patent publication DE 4443911.

(Continued)

*Primary Examiner*—Patricia L. Engle
(74) *Attorney, Agent, or Firm*—Brian B. Shaw, Esq.; Stephen B. Salai, Esq.; Harter, Secrest & Emery LLP

(57) ABSTRACT

A flange cover with a trim lip is provided for finishing a vehicle flange, wherein the flange cover can include a seal. The flange cover is affixed to a single side of the flange and the trip lip projects from an opposed side of the flange to be spaced from the flange. The trim lip can be sized to contact an interior trim piece of the vehicle to occlude a gap between the flange and the interior trim piece. A seal can be operably located on an outside surface of a flange engaging leg.

31 Claims, 3 Drawing Sheets

U.S. PATENT DOCUMENTS 6,012,760 A   1/2000  Nozaki
6,393,766 B1  5/2002  Nozaki et al.
6,530,618 B1  3/2003  Nozaki et al.

OTHER PUBLICATIONS

English abstract of patent publication EP 0329964.

\* cited by examiner

CARRIERLESS FLANGE COVER WITH INTEGRAL TRIM STRIP

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A "SEQUENCE LISTING"

Not applicable.

BACKGROUND OF THE INVENTION

1. Field of the Invention

The present invention relates to vehicular trim strips and weatherseals, and more particularly, to a flange cover with an integral trim strip having reduced requirements for operable connection to a flange, wherein the trim lip is spaced from the flange, and further, such that the flange cover can include a seal such as a sealing bulb or lip.

2. Background Art

The attachment of seals and trim strips to vehicle flanges must satisfy a variety of demands. These demands include operably locating the trim strip as well as sealing relative to the flange. In addition, at least the trim strip must provide an aesthetic appeal. The operable attachment of the seals is further complicated by variances in the thickness of the flange to which the seal is engaged.

U.S. Pat. No. 5,255,472 discloses a weatherseal adapted to be secured on a flange of a vehicle to seal a gap, wherein the weatherseal includes a U shape flange gripping retaining member for engaging both sides of the flange and a separate trim lip.

European Patent No. 0 689 952 discloses a sealing arrangement for sealing around a periphery of an opening wherein the opening is closable by a closure member. The closure member includes a linearly extending support strip providing first and second oppositely directed faces, locking means on the support strip for cooperating with matching engaging means on the periphery of the opening for securing the support strip to the periphery of the opening with the first face of the strip directed towards the periphery of the opening, and a soft sealing profile mounted on the second face of the support strip so as to be partially compressed by the closing of the closure member when the support strip is secured to the periphery of the opening. Further, EP 0 689 952 discloses the formation of a second longitudinally extending support strip secured to the vehicle flange by adhesive, and can include a cosmetic lip.

The need exists for a flange cover with a trim lip which can be employed to cover an exposed flange of a vehicle, as well as operably locate and retain a sealing member such as a bulb or a flap. The need also exists for a flange cover having a reduced weight. The need further exists for a flange cover that can accommodate a variety of flange thicknesses, while maintaining a substantially uniform appearance.

BRIEF SUMMARY OF THE INVENTION

The present invention includes a flange cover with an integral trim lip for providing a uniform aesthetic appearance, while reducing material requirements and hence weight of the flange cover. The flange cover can also include a sealing member, such as a bulb seal to provide the combined functions of a trim strip and a weatherseal.

In one configuration, the flange cover includes a generally concave (carrierless) body having a flange engaging leg for connection to the flange, and an integral trim lip, wherein the trim lip extends from the flange to be spaced from the flange upon operable engagement of the flange engaging leg and the flange. A further configuration of the present flange cover is free of structural metal, thereby reducing manufacturing costs and weight. In contrast to prior flange covers, only the flange engaging leg of the present flange cover engages the flange, while the trim lip obscures the second side of the flange.

In one configuration, the flange cover cooperates with at least one interior trim piece of the vehicle to provide an aesthetically pleasing appearance. That is, a gap often exists between the interior trim piece of the vehicle and the flange to which seals are attached. The present flange cover is constructed to engage the flange and operably locate the trim lip so as to span the gap to the interior trim piece, and overlie a portion of the trim piece. Further, the installation of the flange cover subsequent to installation of the adjacent interior trim piece, removes numerous secondary installation procedures.

DETAILED DESCRIPTION OF THE INVENTION

Figure 1:
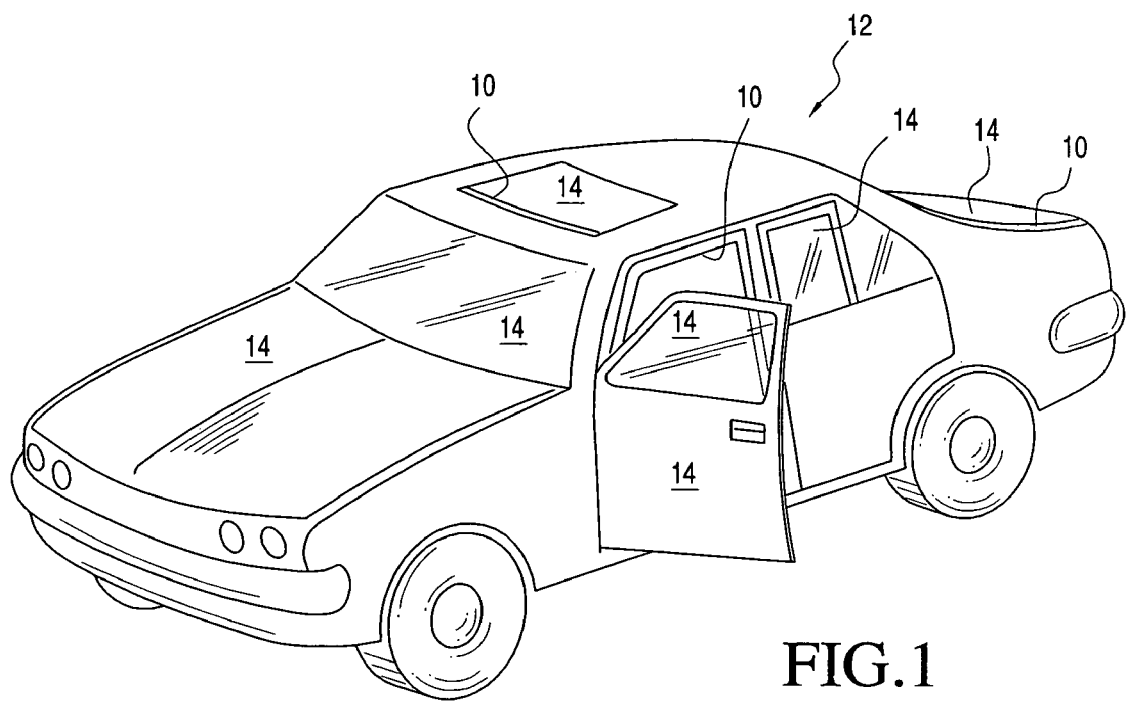
FIG. 1 is a perspective view of an automobile employing the flange cover with trim lip.

Referring to FIG. 1, a flange cover 10 of the present invention can be employed at a variety of locations in a vehicle 12 including those for releasably and repeatedly engaging a panel 14. For purpose of description, the flange cover 10 is described in terms of a weatherseal, however, it is understood the invention can be employed in any application that requires the covering of an exposed vehicle flange 16, with or without an accompanying sealing function.

Figure 3:
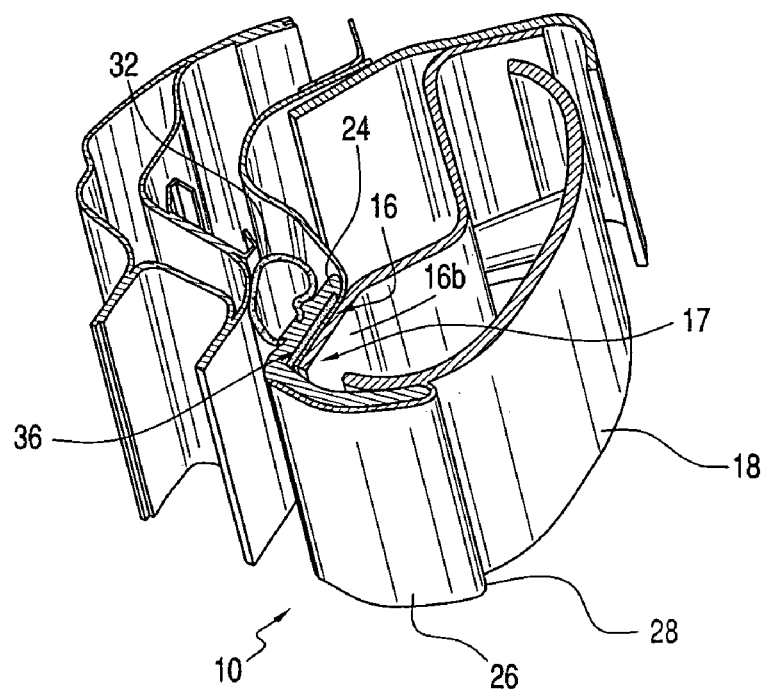
FIG. 3 is a cut away perspective view showing the operable location of the flange cover with integral trim strip.
Figure 4:
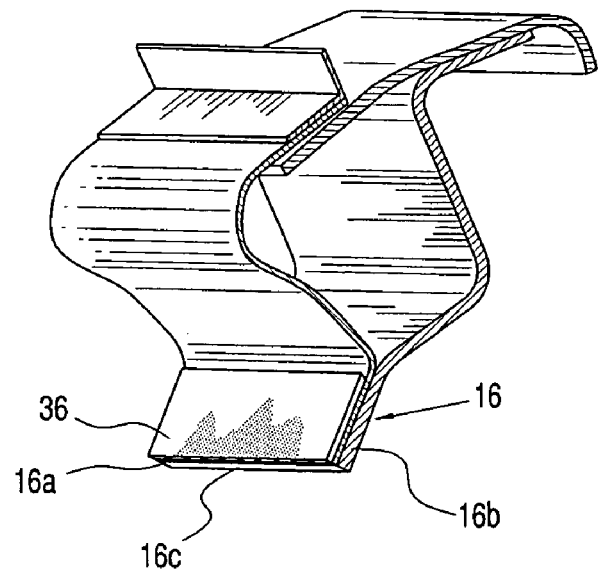
FIG. 4 is a perspective view of a representative flange for engaging the present flange cover.
Figure 5:
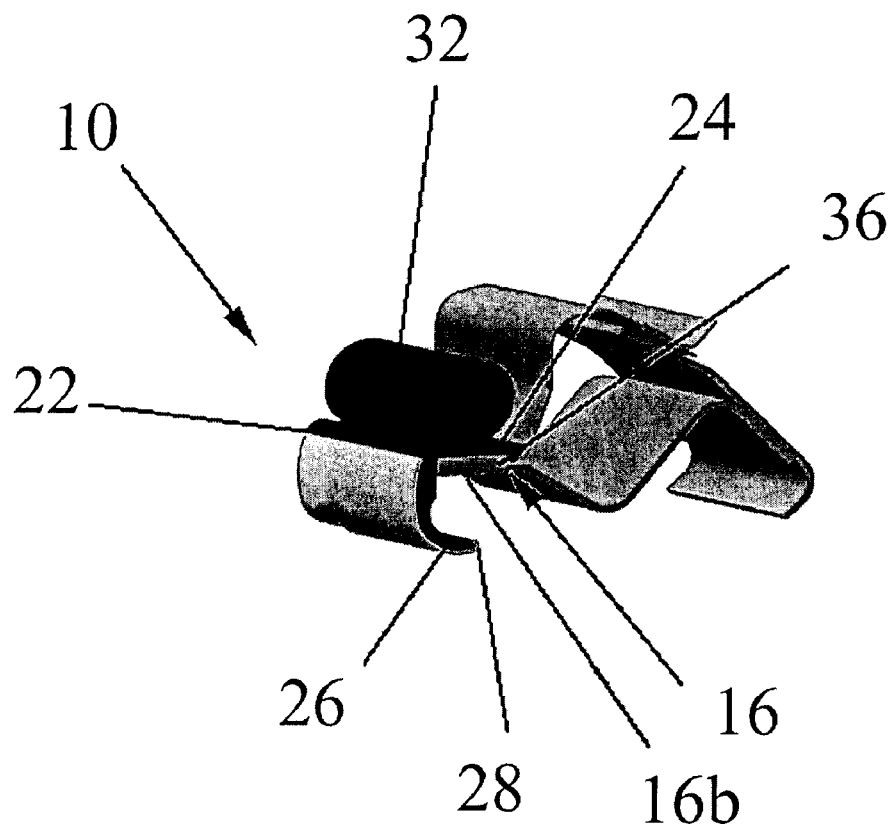
FIG. 5 is a perspective view of the flange cover engaged with a flange.

Referring to FIGS. 3 and 4, the flange 16 includes an outer first side 16a (exposed to the exterior of the vehicle), a terminal edge 16c and an inner second side 16b (exposed to the interior of the vehicle). The outer side 16a of the flange is typically formed as a registered or controlled surface. That is, the outer side 16a is in a predetermined location and orientation with respect to other components of the vehicle, such as the panels 14. In contrast, the inner side 16b can vary depending upon the number of layers or thicknesses in the flange 16. That is, the flange 16 can be formed of one, two, three or more layers of material. Thus, the final location of the inner side 16b can vary, while the outer side 16a is constructed as a registered surface.

Typically, the weatherseal configuration of the flange cover 10 is partially disposed between confronting surfaces such as panels 14. The panels 14 can be any of a variety of materials and do not limit the present invention. For example, the panel 14 can be glass, metal or a composite which is painted, surface treated or bare. In the operating environment, the panel 14 can be brought repeatedly into and out of engagement with the weatherseal. Alternatively, the weatherseal may be moved relative to the panel 14. Further, the flange cover 10 can be located in a substantially fixed position.

The term weatherseal includes, but is not limited to, extrusions, moldings, edge pieces, glass guidance components, glass run channels, weather strips and seals. In the motor vehicle industry, the weatherseal configuration is suitable for use in many areas including, but not limited to, storage compartments, glass guidance components, glass run channels, door seals, roof rails, deck lids, hood to cowl seals, window seals, sun roof seals, van sliders, hatch backs, and/or window channel seals. It is understood the weatherseal can be constructed and operably located in a position that does not perform a sealing function. One example of such non sealing application is a flange cover 10 such as flange finisher, trim or trim piece. Flange covers 10 are disposed on a flange to provide an aesthetically pleasing appearance as well as reduce the risks associated with an otherwise exposed flange.

The flange cover 10 is constructed to cooperatively engage the flange 16 which is formed by at least one piece of material. However, it is understood the flange 16 can be formed of one, two, three or more separate layers, generally defining the first outer side 16a, the second inner side 16b and the terminal edge 16c. For example, typical flanges can have a thickness from approximately 2 mm to approximately 10 mm.

In certain environments, the flange cover 10 can be employed in conjunction with at least one vehicle trim piece 18, wherein the flange cover is constructed to span a distance from the vehicle flange 16 to the vehicle trim piece 18, and preferably overlie a portion of the trim piece. That is, as seen in FIG. 3, the flange cover 10 is typically employed in cooperation with an interior trim piece 18 of the vehicle 12. The interior trim piece 18 is usually a separate and independent component from the flange cover 10, and can include headliners, carpets, panels or other trim features, such as but not limited to A-pillar trim, B-pillar trim and quarter panel trim. The interior trim piece 18 is often spaced from the flange 10 by a distance that is often less than 20 mm, usually less than 10 mm and typically approximately 5 mm. Thus, a gap 17 can exist between the flange 16 and the interior trim piece 18.

Figure 2:
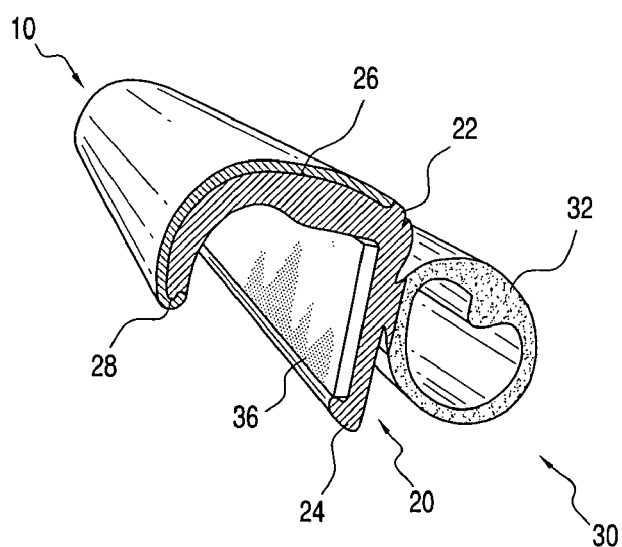
FIG. 2 is a perspective view showing a cross section of the flange cover.

Referring to FIG. 2, the flange cover 10 includes a body 20, formed by a closed end 22, a flange-engaging leg 24, and a trim lip 26. The body 20 is generally concave defined by the closed end 22, the flange engaging leg 24 and the trim lip 26. Although described as separate elements, it is understood the flange engaging leg 24 and the trim lip 26 can be integrally formed without defining or providing a closed end 22. That is, an apex of the concave body 20 can be an identifiable closed end 22, or a gradation (transition) from the flange engaging leg 24 to the trim lip 26.

In one configuration, the body 20 is formed of polymeric material and is free of structural metal. That is, the body 20 does not include a flange gripping reinforcing core or member such as a wire carrier, knit carrier, stamped or lanced and stretched metal carrier or a more rigid polymeric member such as thermoplastic. However, it is understood the body 20 can include non structural metal such as fillers or colorants.

In one configuration, the body 20 is formed of a polymeric material, such as thermoplastic or thermoset including TPE's (thermoplastic elastomers) and EPDM, as well as combinations of these materials. Further, it is contemplated the body 20 can be formed such that different sections exhibit different hardness, rigidity or density. Typical polymeric materials include hard or soft dense EPDM, or hard or soft TPV (thermoplastic vulcanizates) compounds. Formation of the flange cover 10 without embedded structural metal provides the advantage that the flange cover can be readily recycled without requiring the separation of metal from the polymeric materials prior to recycling.

Unlike prior devices, the body 20 does not include a U shape flange engaging channel, wherein both legs of the channel engage the flange. In contrast, only the flange engaging leg 24 is affixed to the flange 16, and the trim lip 26 is configured to project away from and be spaced from the flange. Thus, the trim lip 26 is non contacting with the flange 16.

Preferably, the body 20 is an integral construction of the flange engaging leg 24, the trim lip 26 and the closed end 22. Although the body 20 is formed without a traditional U shape flange gripping carrier for pinching the flange, it is understood, an elongation reducing, strengthening or stiffening member can be located within one of the flange engaging leg 24, the closed end 22 or the trip lip 26. For example, the flange engaging leg 24 can include a cord, a tape, or ribbon which can include, but is not limited to, fiberglass, foil, stamped metal, lanced and stretched metal or carbon threads. It is understood that even a wire carrier can be embedded in the body 20, wherein the carrier is not deformed to a flange gripping configuration, but rather functions to control a distortion of the body.

The flange engaging leg 24 is engaged with the first surface (side) 16a of the flange 16 by any of a variety of couplings 36 such as adhesives, tapes, pins, clips, tape, hook and loop fasteners, mastics and detents as well as magnetic attraction. Thus, an inside surface of the flange engaging leg 24 is proximate to the flange 16 and connected to the flange to be affixed relative to the flange. Typically, engagement of the flange engaging leg 24 and the flange side 16a is a fixed connection, however, it is understood a releasable connection can be employed, yet the flange cover 10 remains operably located relative to the flange 16.

The coupling 36 of the flange engaging leg 24 to the first flange side 16a can be accomplished by (i) double sided tape along either the flange engaging leg or the flange side 16a; (ii) disposing an adhesive layer on the flange engaging leg, such as by extrusion with formation of the body 20; (iii) a heat activated adhesive layer along at least one of the flange engaging leg and the flange side 16a, or (iv) a pressure activated tape or adhesive applied to at least one of the flange engaging leg or the flange side 16a.

Figure 6:
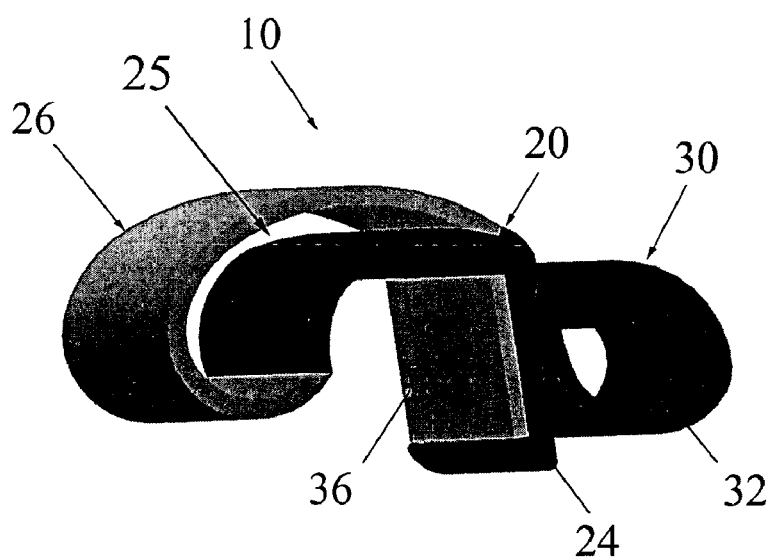
FIG. 6 is a cross-sectional, partial perspective view showing the flange cover having a trim lip with a hollow section.

The trim lip 26 extends from the closed end 22 of the body 20 (or from the flange engaging leg 24) to extend away from the second side 16b of the flange 16. The trim lip 26 can have any of a variety of configurations including linear, curvilinear or multifaceted. Further, the cross section of the trim lip 26 can be constant or varied by extending from the closed end 22 to a free end 28 of the lip. For example, as seen in FIG. 6, the trim lip 26 can include a hollow section 25 formed from one or more materials. It is understood the hollow section 25 can be formed in homogeneous trim lip, rather than a laminate trim lip. Preferably, the trim lip 26 is integrally formed with the flange engaging leg 24. However, it is understood, the trim lip 26 and flange engaging leg 24 could be separately formed, and connected in a subsequent process. Thus, the trim lip 26 is integrally connected by monolithic construction, processing or bonding to form a one piece construction for installation. Further, referring to FIG. 3, the trim lip 26 is preferably sized to span the gap 17 between the flange 16 in the interior trim piece 18 of the vehicle. Thus, the length of the trim lip 26 is usually determined by the intended operating environment of the flange cover 10. The trim lip 26 can be sized to overlie a portion of the interior trim piece 18, thereby accommodating build tolerances of the vehicle body and the interior trim piece.

The trip lip 26 can be formed of the same material as the closed end 22 and the flange engaging leg 24. Thus, the trim lip 26 can be formed of a soft or dense EPDM, wherein a coating or veneer can be located on an exposed surface of the trim lip. The coating or veneer can be a thermoplastic or a thermoset material. For example, the veneer, or coating can be a color matched thermoplastic such as, but not limited to, TPE or TPV, or a color matched thermoset such as a rubber. It is also understood a contiguous colliquefaction, or powder coating can be formed on the trim lip 26. Further, a flocking can be applied to the surface of the trim lip 26, as well as additional surfaces of the body 20. In a further configuration, it is contemplated that a cloth covering can be applied to the body 20 to overlie at least one of the trim lip 26, the flange engaging leg 24 or the closed end 22. Alternatively, the entire body 20 can be formed entirely of a colored polymer to match the intended operating environment of the flange cover 10.

In addition, the body 20 can be formed to combine with, or to integrally include a sealing member 30 such as a sealing bulb 32, shown in FIGS. 2–5 and 7. The sealing bulb 32 can be formed from a polymeric material, including the same material as the body 20. Typical materials for the sealing bulb 32 include, but are not limited to cellular or sponge EPDM or TPV. Alternatively, the sealing bulb 32 can be formed of a different density or different material and affixed to the outside surface of the flange engaging leg 24 by any of a variety of mechanisms including bonding, adhesives, welding, thermal welding and ultrasonic welding. In addition, the sealing member 30 can be any of a variety of configurations including flaps, bulbs or fingers.

Installation of the flange cover 10 can be accomplished by any of a variety of mechanisms, depending upon the sequencing in the vehicle construction process as well as the intended operating environment. For example, available application methods include hand installation, in set lengths, from an extended supply or by robotic or machine controlled installation. As the trim lip 26 is spaced from the flange 16, the flange cover 10 can be installed as a final step in the trimming of the vehicle. That is, the trim pieces 18 can be installed on the vehicle prior to the flange cover 10. Thus, there is reduced risk of damage or marring of the flange cover (and seal).

Specifically, in prior installation processes employing a generally U-shaped flange engaging body having a projecting finishing lip, operable engagement of the U-shaped body with the flange required secondary tools such as a crimping roller to accommodate varying thickness of the flange. The use of the crimping roller required that the U-shaped flange engaging body (with finishing lip) be installed prior to installation of any adjacent interior trim pieces. This prior installation of the U-shaped flange engaging body resulted in the subsequently installed interior trim piece overlying the finishing lip. To operably locate the finishing lip, a pull/rip/tear cord connected to the finishing lip would be pulled to locate the finishing lip. Alternatively, the finishing lip was manually deformed to move from underneath the interior trim piece to atop the interior trim piece.

In contrast, the flange cover 10 allows a more efficient order of installation of the interior trim piece 18 and the flange engaging sealing member. As the present flange cover 10 engages only a single side of the flange 16 and does not require a secondary installation step such as crimping, the flange cover can be installed subsequent to installation of the interior trim pieces 18. As the flange cover 10 is installed subsequent to the interior trim pieces 18, the trim lip 26 is automatically located in the desired operable position (particularly with respect to the interior trim piece 18). That is, the trim lip 26 spans the gap 17 from the flange 16 (the inner side 16b) to the interior trim piece 18, so as to overlie a portion of the interior trim piece, without requiring additional installation procedures or steps. Thus, the flange cover 10 effectively trims from an exterior sheet metal (side 16a of the flange 16) to an interior panel (trim piece 18).

Upon operable installation, the flange engaging leg 24 is engaged with the flange 16 so as to be affixed to the first side 16a, and the trim lip 26 extends from the closed end 22 of the body 20, away from the flange such that the free end 28 of the trim lip does not engage the flange. That is, the trim lip 26 is non contacting with the flange 16. Further, the trim lip 26 extends from the flange 16 to span the gap 17 and overlie an adjacent portion of the interior trim piece 18. In addition, a portion of the trim lip, such as the free end 28, (or an adjacent portion) will contact, or rest upon the interior trim piece 18.

Thus, the present flange cover allows the trim lip 26 to float relative to the flange 16 to occlude the gap 17 and thus provide a smooth continuous aesthetically pleasing appearance. In certain configurations, the trim lip 26 extends a sufficient distance from the flange 16 to contact the vehicle interior trim piece 18 as seen in FIG. 4.

The present configuration of the flange cover 10 provides a number of advantages over the prior art. By requiring connection to only a single side of the flange 16, the flange cover 10 can be operably employed on any of a variety of flange thicknesses without distorting the flange cover. Because the flange cover 10 can be applied without requiring a secondary crimping step or a pull cord actuation, not only are installation costs reduced, but the flange cover (with associated seal) can be applied at later stages of the vehicle fabrication process, thereby, for example, allowing installation after the vehicle trim 18. That is, secondary operations such as crimping or pull cord actuation are not required when installing the flange cover 10.

Further, the weight of the flange cover 10 is reduced by employing only a single leg to engage the flange 16. The lack of a flange gripping structural metal reinforcing core also reduces the weight of the flange cover 10. The lack of a flange gripping core allows the flange cover 10 to be stored in a coiled configuration, such as on a reel. The storage of the flange cover 10 on a reel and the lack of a structural metal core enhance the availability of robotic installation of the flange cover. That is, by providing extended lengths of the flange cover 10, the need to load or provide specific lengths of the flange cover to the robot is reduced. In addition, the lack of a metal carrier allows the flange cover 10 to be readily cut to length by the robot, without requiring excessive force or complicated tooling. The lack of structural metal, such as a flange gripping carrier also reduces the "read through" of the carrier. That is, the "hungry horse" appearance, that can occur when the underlying metal structure distorts the surface of the overlying polymeric material, is avoided by constructing the flange cover 10 to be free of structural metal.

A further benefit of the present flange cover 10 is derived from connecting to the outer side 16a of the flange 16. Specifically, as the outer side 16a is the registered surface, and the flange cover 10 is independent of the location of the inner side 16b, any sealing member 30 is more accurately located upon installation. That is, in flange gripping constructions of the prior art, the seal location can be altered as the flange gripping portion engages flanges of differing thickness. In contrast, the flange cover 10 directly locates the sealing member 30 relative to the registration surface of the outer flange side 16a. As the sealing member 30 can be more accurately located, the sealing member can be designed with reduced requirements of locating a sealing surface.

While the invention has been described in connection with a presently preferred embodiment thereof, those skilled in the art will recognize that many modifications and changes can be made without departing from the true spirit and scope of the invention, which accordingly is intended to be defined solely by the appended claims.

What is claimed is:

1. A flange cover with trim lip for engaging a flange having a terminal edge and a first and a second opposed side, the flange cover comprising a generally concave body having a closed end, a flange engaging leg and a trim lip, the flange engaging leg extending from the closed end for being affixed to the first side of the flange, and the trim lip extending from the closed end to be spaced from the second side of the flange along an entire length of the trim lip to locate the flange between the trim lip and the flange engaging leg, the body precluding operable contact with the second side of the flange.

2. The flange cover with trim lip of claim 1, wherein the body is formed of a polymeric material.

3. The flange cover with trim lip of claim 1, wherein the body is free of a carrier.

4. The flange cover with trim lip of claim 1, wherein the body is free of structural metal.

5. The flange cover with trim lip of claim 1, further comprising an adhesive for bonding an inside surface of the flange engaging leg to the first side of the flange.

6. The flange cover with trim lip of claim 1, further comprising a sealing member extending from an outside surface of the flange engaging leg.

7. The flange cover with trim lip of claim 1, further comprising a sealing bulb extending from an outside surface of the flange engaging leg.

8. The flange cover with trim lip of claim 1, wherein the trim lip has a varying cross section along a length of the trim lip.

9. The flange cover with trim lip of claim 1, wherein the trim lip defines a hollow section within a cross section of the trim lip.

10. A flange cover for engaging a flange having a first side and a second side, the flange cover comprising:
   (a) a flange engaging portion; and
   (b) a trim lip connected to the flange engaging portion, the trim lip having a free end, the trim lip spaced from the second side of the flange along a length of the trim lip to dispose a portion of the flange intermediate the trim lip and the flange engaging portion,
   the flange engaging portion and the trim lip selected to preclude operable contact with the second side of the flange.

11. The flange cover of claim 10, wherein the flange engaging portion is formed of a polymeric material.

12. The flange cover of claim 10, wherein the flange engaging portion is free of a carrier.

13. The flange cover of claim 10, wherein the flange engaging portion is free of structural metal.

14. The flange cover of claim 10, further comprising an adhesive for bonding an inside surface of the flange engaging leg to the first side of the flange.

15. The flange cover of claim 10, further comprising a sealing member extending from an outside surface of the flange engaging leg.

16. The flange cover of claim 10, further comprising a sealing bulb extending from an outside surface of the flange engaging leg.

17. The flange cover of claim 10, wherein the trim lip has a varying cross section along a length of the trim lip.

18. The flange cover of claim 10, wherein the trim lip defines a hollow section within a cross section of the trim lip.

19. A flange cover for engaging a flange having a first side, a terminal edge and a second side, the flange cover comprising
   (a) a single flange engaging leg adapted to engage only the first side of the flange; and
   (b) a trim lip connected to the single flange engaging leg, the trim lip configured to overlie the terminal edge and be spaced from the second side of the flange to dispose a portion of the flange intermediate the trim lip and preclude operable contact of the flange cover and the second side of the flange.

20. The flange cover of claim 19, wherein the flange engaging leg is formed of a polymeric material.

21. The flange cover of claim 19, wherein the flange engaging leg is free of a carrier.

22. The flange cover of claim 19, wherein the flange engaging leg is free of structural metal.

23. The flange cover of claim 19, further comprising an adhesive for bonding an inside surface of the flange engaging leg to the first side of the flange.

24. The flange cover of claim 19, further comprising a sealing member extending from an outside surface of the flange engaging leg.

25. The flange cover of claim 19, further comprising a sealing bulb extending from an outside surface of the flange engaging leg.

26. The flange cover of claim 19, wherein the trim lip has a varying cross section along a length of the trim lip.

27. The flange cover of claim 19, wherein the trim lip defines a hollow section within a cross section of the trim lip.

28. A flange cover for operable location relative to a vehicle flange and a spaced interior trim piece separate from the flange cover, the vehicle flange having a first side and a second side, the flange cover comprising:
   (a) a flange cover body configured to engage only a single side of the flange and preclude contact with the second side of the flange; and
   (b) a trim lip extending from the flange cover body and locating a portion of the interior trim piece intermediate the trim lip and the second side of the flange.

29. The flange cover of claim 28, wherein the trim lip is sized to occlude the gap.

30. The flange cover of claim 28, further comprising one of a reinforcing member and an elongation reducing member in the flange cover body.

31. The flange cover of claim 28, wherein the flange cover body is free of structural metal.

* * * * *